HARVEY & TRACY.
Rice Cleaner.
No. 210.  Patented May 30, 1837.
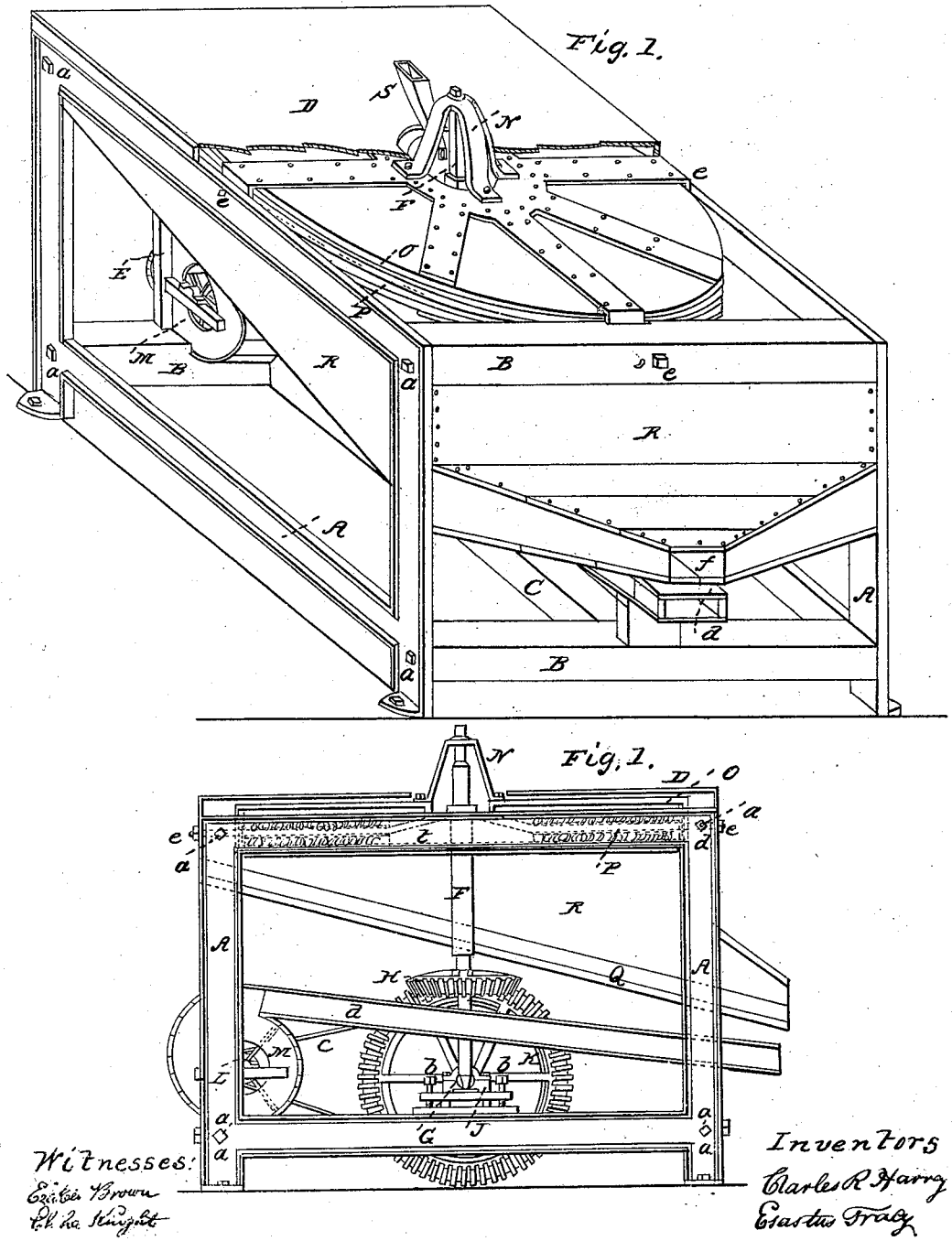

UNITED STATES PATENT OFFICE.

CHS. R. HARVEY AND ERASTUS TRACY, OF POUGHKEEPSIE, NEW YORK.

MACHINE FOR HULLING AND SCOURING RICE.

Specification of Letters Patent No. 210, dated May 30, 1837.

*To all whom it may concern:*

Be it known that we, CHARLES R. HARVEY, and ERASTUS TRACY, of the town of Poughkeepsie, in the county of Dutchess and State of New York, have invented a new and useful Improvement in Machines for Hulling and Scouring Rice; and we do hereby declare that the following is a full and exact description of the construction and operation of the said machine as invented by us, reference being had to drawings annexed.

Figure 1 is a perspective view of said machine. Fig. 2 represents an elevated side view of the machine with parts of inclosure and frame work removed.

A A Fig. 1, A A Fig. 2, parts of the frame or superstructure which we make of cast iron but may be made of timber.

B, B, B Fig. 1, side girts, other parts of the frame attached to them by screw bolts as at *a a a a* Fig. 1 and *a a a a* Fig. 2

C Fig. 1, bridge tree upon which the step to perpendicular shaft F rests.

D Fig. 1, D Fig. 2, cover for the top of the machine which is fastened to frame by hooks.

E Fig. 1, is one of three studs to which the blower is attached and supported.

F Fig. 1, F Fig. 2, spindle on perpendicular shaft of the runner.

G, Fig. 2, shows the end of bearing of driving shaft affixed in plumer box J.

H Fig. 2, is a pinion on perpendicular spindle working in cog wheel I.

I, Fig. 2, cog wheel on driving shaft G, 2 to 1 of pinion H.

J Fig. 2, plumer box of driving shaft G and step of perpendicular shaft F combined—regulated by temper screws *b b* Fig. 2 which screws serve to raise and fall the runner hereafter described in a manner not to disengage the teeth of the cog wheels.

K Fig. 2, pulley on driving shaft G connected by belt *c* to pulley L which is 6 to 1 of the latter small pulley.

L Fig. 2, small pulley on fan shaft.

M Fig. 1, M Fig. 2, fan and envelop of fan showing the wind conductor *d* Fig. 1, and *d* Fig. 2, said fan is constructed with four wings in the ordinary way for making rotary fans.

N Fig. 1, N Fig. 2, spider forming the upper bearing for perpendicular shaft F and is attached to bed O Figs. 1 and 2, hereinafter described.

O Fig. 1, O Fig. 2 inverted beds two kinds of which are used, one with emery for hulling, the other with lamb skin for scouring. The superstructure is cast iron—having eight arms fastened to the frame by four of the arms as at *e e e* Fig. 1, and *e e*, Fig. 2. The one for hulling is constructed by fastening plank to the arms by screws and then forming a rim 1½ inches deep around the periphery of the bed—also forming another rim of the same depth within 10 inches of the center, it is then filled up with curled hair with strong canvas cloth stretched over and nailed to the rims, after which No. 3 emery is glued upon the canvas forming an even surface.

The one for scouring, the face is covered with lamb skin the felt being sheared to ¾ of an inch long. Remarks—we commonly use two machines in hulling and scouring rice and barley differing only in the bed as above described; but by shifting the bed the work can be performed in a single machine—it will be observed that the bed is inverted from the ordinary methods of mills.

P Fig. 1, P Fig. 2, the runner attached to the perpendicular shaft and constructed in precisely the same manner of the bed having an emery face in all cases, for hulling No. 3 emery and for scouring No. 0 emery.

Q Fig. 2, flooring on which the rice drops from the runner and is made to incline in a manner to discharge the rice at *f* Fig. 1 and *f* Fig. 2 when it drops in front of the mouth of the blower *d* Figs. 1 and 2, which separates the chaff from the rice.

R R, Fig. 1, R Fig. 2, parts of envelop of grain chest connecting the flooring Q Fig. 2, with frame work A A Fig. 1, and 2d and B Fig. 1.

S Fig. 1, shows the spout leading from the hopper the hopper is to be constructed the same as common grain mill hoppers.

Remarks: The scale of inches of Fig. 2 shows the size of all the parts of the within described machine.

Operation: The rice falls from the shoe onto the convex part (*t*) of the runner P Fig. 2, which slides the kernels upon the emery surface of said runner. The emery face is rendered elastic by the curled hair and at a speed of some 200 turns will render enough to turn over the kernel without danger of breaking it.

The different parts of the within described machine may be varied in proportions without effecting the general features of the machine.

What we claim as new and wish to secure by Letters Patent in this machine is—

1. The particular manner of constructing the elastic bed and runner by the use of curled hair.

2. The construction of the inverted bed.

3. The particular manner of introducing the grain between the working faces by the convex form of the runner at *t* Fig. 2.

4. The particular arrangement and combination of the different parts many of which are old but taken together present a new arrangement of a machine.

CHARLES R. HARVEY.
ERASTUS TRACY.

Witnesses:
ELISHA KNIGHT,
EZEKIEL BROWN.